Oct. 27, 1936.     J. DALO     2,058,957

CLASP OR COUPLING DEVICE FOR BRACELETS, CHAINS AND THE LIKE

Filed June 15, 1936

Inventor:
John Dalo

By
Attorneys.

Patented Oct. 27, 1936

2,058,957

UNITED STATES PATENT OFFICE 2,058,957

CLASP OR COUPLING DEVICE FOR BRACELETS, CHAINS AND THE LIKE

John Dalo, Providence, R. I., assignor to A and Z Chain Company, Providence, R. I., a corporation of Rhode Island Application June 15, 1936, Serial No. 85,245

10 Claims. (Cl. 24—265)

This invention relates to improvements in clasps, connectors or coupling devices for connecting the ends of watch-bracelets, chains, straps and the like and consists particularly in a safety device or guard therefor.

One object of the invention is to provide a clasp, connector or coupling device of the type indicated having means for preventing accidental or unwarranted uncoupling of the ends of the bracelet, chain or other band, either when the device is closed and in use, or when it is first opened to disconnect the parts.

Another object of the invention is to provide a device of the type indicated having hinged elements adapted to engage the looped members at the ends of the bracelet, chain or the like and to be closed together to secure the ends in connection, with additional safety means for retaining the detachable end attached to the device until it is further released.

Another object of the invention is to provide a device of the type indicated which may be produced from sheet-metal with its parts blanked out and struck up in dies to render it economical to manufacture.

Another object of the invention is to provide a device of the type indicated which is ornamental in appearance, simple in structure, proof against derangement or getting out of order, and durable in use for long periods of time.

Further objects of the improvement are set forth in the following specification which describes, by way of example, a preferred form of construction of the device and one alternative embodiment as illustrated by the accompanying drawing. In the drawing.

In accordance with a present vogue, ladies' wrist-watches are worn with cord bracelets and the present device is particularly adapted for connecting the ends of the bracelet-sections to provide security against accidental release thereof liable to result in the dropping of the watch and damage thereto or loss thereof. It is to be understood, however, that the present improved connector or coupling may be used for other purposes such as connecting the ends of chains, necklaces, straps, bands and bracelets of other types from that herein shown and described. The present improved connector or coupling consists essentially of two hinged parts adapted to hook through the looped end-members of the bracelet and to be closed together to secure the bracelet on the wrist. Embodied in the two-part coupling is a third element which may be termed a safety latch or guard, one end of the bracelet being permanently attached to the coupling and the other end adapted to be disconnected only after release of the safety latch.

Figure 1:
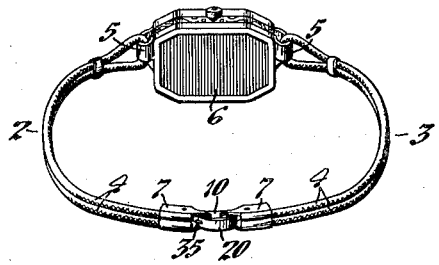
Fig. 1 is a perspective view showing a ladies' wrist-watch with a cord bracelet attached thereto and having its ends joined together by the present improved connector or coupling device.
Figure 2:
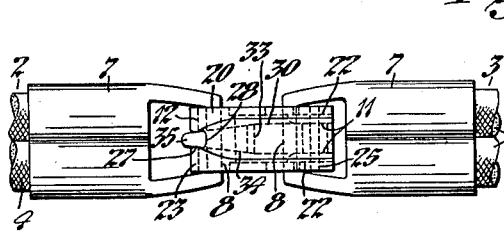
Fig. 2 is an enlarged plan view of the device shown as connecting the looped end-members of the cord bracelet.

As before indicated, the present coupling device is shown in the present drawing as employed for attaching the ends of a cord bracelet of popular type. Referring to Fig. 1 of the drawing, the bracelet may consist of two sections 2 and 3 of leather, fabric or braided silk cord, each section comprising a length of the cord 4 looped through one of the ears or lugs 5 on the sides of the watch 6. Each length of cord is doubled back on itself with its ends secured in or attached to a suitable end-member 7. The end-members 7 may be of hollow construction to contain the ends of the cord 4, and preferably, they terminate in loops 8 for engagement with the coupling device to fasten the bracelet around the wrist of the wearer.

Figure 8:
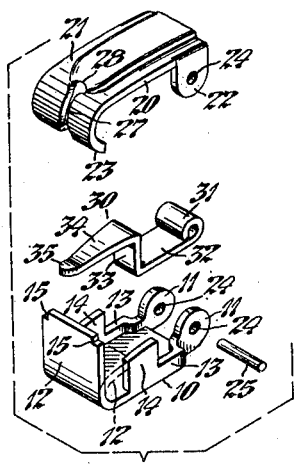
Fig. 8 is a composite perspective view of the several parts of the connector or coupling shown in disassembled relationship.

The present improved coupling device comprises a base member 10, best illustrated in Fig. 8, formed with opposite parallel hinge-ears 11 at one end and extended at the opposite end in a tab 12 which is adapted to be engaged through the loop on the end-member 7 and bent around its crossbar. The sides of the base member 10 are folded upwardly at right-angles to form reinforcing ribs 13 extending forwardly from the hinge-ears 11. The ribs 13 are further extended upwardly in projecting ears 14 of rectangular shape spaced apart to adapt them to receive therebetween the end of the bent-over or looped tab 12, as indicated by dotted lines in Fig. 8. Preferably, the forward end of the tab 12 is notched at either side, as indicated at 15, to adapt it to dovetail with the edges of the ears 14 whereby the edges of the loop will be flush with the sides of the ears to give a smooth finish to the sides of the coupling. The base member 10 may be blanked from sheet-metal and bent or formed to the shape illustrated in Fig. 8 by striking it up in suitable dies. Its tab 12 is then inserted through the loop on the end-member 7 of the bracelet and curled around the crossbar 8 thereof with its notched end interfitting with the upstanding ears 14 on the sides of the base member, see Figs. 3 and 5.

Hinged to the base member 10 is an upper latch or cover member 20 constructed in the form as shown most clearly in Fig. 8. The member 20 is blanked from sheet-metal and struck up in dies to form it with a longitudinally-extending portion 21 provided at one end with integral hinge-ears 22 folded downwardly at right-angles thereto. At its opposite end the member 20 is curled around to form a depending hook or beak 23 adapted to snap over the curved portion of the looped tab 12 on the base member 10. The hinge-ears of both the base member 10 and latch member 20 are perforated with holes 24 for receiving a pin 25 to pivotally connect the two parts in hinged relationship.

Figure 7:
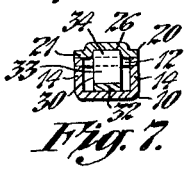
Fig. 7 is a transverse sectional view of the coupling taken on line 7—7 of Fig. 3.

As shown most clearly in Figs. 7 and 8, the top of the clasp member 20 is crowned upwardly or embossed throughout its length to form a longitudinally-extending recess 26 on its under side, provided for a purpose as later explained. The forward hooked end of the member 20 is split or bifurcated with a slot 27, the sides of which are curved or cam-shaped longitudinally as shown most clearly in Fig. 4. That is to say, the slot 27 has a widened opening or mouth at its forward end and also a widened portion or notch 28 at its closed end, see Fig. 8.

Figure 4:
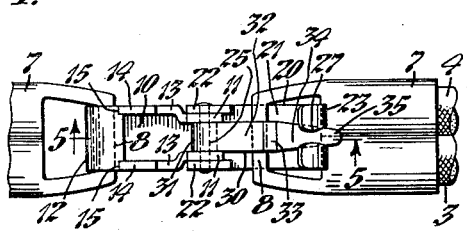
Fig. 4 is an enlarged plan view showing the coupling partly open or unclasped.
Figure 5:
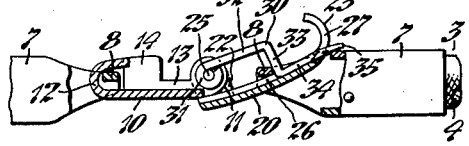
Fig. 5 is an elevational view of the coupling in part section on line 5—5 of Fig. 4, showing it partly unclasped or opened.

The safety device or guard consists in a latch 30 constructed from a relatively narrow strip of sheet-metal of slightly tapering form in plan view. One end of the latch or guard 30 is curled or rolled upon itself to provide a cylindrical bearing 31 adapted to receive the hinge-pin 25 which pivotally connects the two main members 10 and 20 of the coupling. The latch 30 extends forwardly from the bearing 31 in an arm 32 and is then offset upwardly at right-angles in a portion 33 which performs an important function in the co-operation of the parts of the coupling. From the upright portion or leg 33 the latch is extended forwardly in a tapered arm 34 terminating in a rounded end which is slightly curled upwardly to form a finger-grip 35. As shown in Figs. 4 and 5, the bearing 31 of the latch 30 is proportioned to fit between the ears 11 on the base member 10 and the ears 22 of the cover or latch 20 overlie the outer faces of the ears 11. The pin 25 extends through the ears 11 and 22 and through the bearing 31 with its ends headed over or riveted to secure the parts in pivotal connection.

Figure 3:
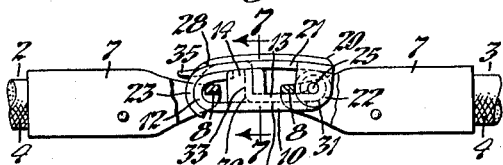
Fig. 3 is a similarly enlarged side elevation of the same showing the coupling with its parts closed.

With the parts of the clasp in closed relationship the main arm 32 of the safety latch or guard 30 seats against the flat bottom of the lower member 10, as shown in Fig. 3, and the upper member or cover 20 is closed down against the upper edges of the ears 14 with its hooked end or beak 23 sprung or snapped over the curved side of the looped tab 12. As shown in Figs. 3 and 5, the cover or upper member 20 of the coupling is preferably slightly bowed or arcuately shaped along its length. The outer tapered arm 34 of the safety latch 30 is also arched or bowed slightly correspondingly therewith so that with the latch closed the arm 34 fits snugly within the longitudinal recess 26 on the under side of the cover.

Referring to Fig. 5, it will be observed that with the outer arm 34 of the safety latch or guard 30 seated in the recess 26 on the under side of the cover 20 the offset leg 33 will make a sharp angular joinder with the side portions of the cover, this feature being important for a reason as later pointed out. The latch or guard 30 is held in its closed or interengaging position with respect to the cover 20 by the engagement of the end of its tapered arm 34 with the notch 28 at the inner end of the slot 27. In closing the parts together the end of the arm 34 readily enters the widened mouth of the slot 27 and springs the two parts of the bifurcated end of the cover 20 apart to allow the terminal portion of the arm to snap into the notch 28. In this way the safety latch or guard 30 is securely held in engagement with the cover member 20. With the parts of the coupling assembled in the manner as above described the device operates in practice as next explained.

It will be understood that the lower or base member 10 is permanently secured to the end-member 7 of the bracelet-section 2 by hooking the tab 12 through the loop of the latter and bending it around to engage it with the ears 14. The crossbar 8 of the end-member 7 is thus held in the space between the loop of the tab 12 and the edges of the ears 14. The upper clasp element or cover 20 is assembled with the base member 10 in the manner hereinbefore explained with its ears 22 overlapping the ears 11 and pivotally joined thereto by the hinge-pin 25. The safety latch or guard 30 is pivotally connected with the two main members 10 and 20 by the hinge-pin 25 which passes through the bearing 31 on the latch with the latter located between the hinge-ears 11 on the base member 10.

With the parts assembled as above explained the clasp or coupling is applied to use by hooking the cover member 20 through the loop of the end-member 7 on the bracelet-section 3. The cover 20 is then swung over to engage its hook or beak 23 with the curved side of the tab 12 on the base member 10, as shown in Fig. 3, and during this operation the safety latch or guard 30 will be swung with the cover until its arm 34 brings up against the top of the looped tab 12. As the cover 20 springs into locking engagement with the base member 10 the arm 34 of the latch 30 seats in the longitudinal recess 26 on the under side of the cover, being carried into this relationship as the end of its tapered arm slides through the slot 27 in the beak 23 of the cover and snaps into the orifice or notch 28. Through this engagement of the end of the arm 34 with the notch 28 the safety latch or guard 30 is locked in connection with the cover 20 so that when the latter is opened the latch will swing open with it in the manner as indicated in Fig. 5.

Figure 6:
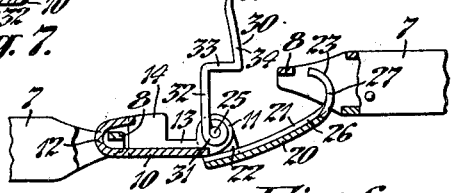
Fig. 6 is a similar longitudinal sectional view showing the coupling completely unclasped and the safety device or guard released.

It will be noted that with the clasp or coupling closed, as shown in Fig. 3, the crossbar 8 of the end-member 7 on the bracelet-section 3 is held in the space between the hinge-ears 22 on the cover 20 and the edges of the ears 14 so that it may have a slight play therein while being effectually secured to the coupling and thereby to the opposite end-member 7 of the bracelet. To open the clasp or coupling the fingernail is inserted under the curved end 35 of the latch 30 which projects from the hooked end of the cover 20 and by lifting the latch the cover may be released from its hooked engagement with the base member 10 to swing it into open position as shown in Fig. 5. However, as before stated, the safety guard 30 will remain engaged with the cover 20 and will swing open with it, thus maintaining the crossbar 8 of the end-member 7 against release until the safety latch or guard 30 is swung away from the cover. That is to say, when the cover 20 is swung back as shown in Fig. 5 the end-member 7 will still be held connected with the coupling by the engagement of its crossbar 8 with the offset leg 33 of the safety latch or guard 30. The ends of the bracelet will thus be still held connected without danger of premature release when the cover 20 is opened. The purpose of arranging the extension or arm 34 of the latch or guard 30 to seat in the recess 26 of the cover will now be apparent; this interrelationship of the parts insuring that the crossbar 8 of the end-member 7 cannot slide under the bent elbow between the leg 33 and extension 34 of the guard even though considerable force is exerted to pull the ends of the bracelet apart. The locking engagement between the guard 30 and the cover 20 prevents the latch from lifting or being forced upwardly by a pull on the bracelet to release the crossbar 8 of the end-member 7; but the end member may be readily disconnected from the coupling by manually lifting the latch 30 away from the cover 20 to swing it back into the position shown in Fig. 6 of the drawing. A slight pressure of the fingernail on the end 35 of the safety latch 30 will cause it to spring out of the slot 27 in the bifurcated end of the cover 20 to completely release the end-member 7 so that the two parts of the bracelet may be uncoupled.

Figure 9:
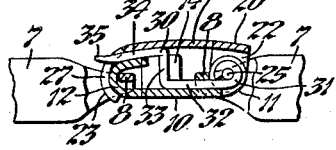
Fig. 9 is a longitudinal sectional view of the connector or coupling illustrating a variation in the form of its construction.

Fig. 9 shows a modified form of construction of the device wherein the cover member 20 has a flat top without any recess for the end of the latch 30 as illustrated in the other views of the drawing. It has been determined that if the offset leg 33 of the safety latch 30 is bent at a sharp angle to the extension 34 the latch will still serve as an effective guard to prevent the crossbar 8 of the end-member 7 from pulling under the latch to allow it to escape from the coupling. However, to make assurance doubly sure and to compensate for irregularities of manufacture the first form of construction is preferable as having the extended arm 34 of the latch seated in the recess 26 in the cover so that the crossbar 8 of the end-member 7 cannot possibly raise the guard and escape from the coupling.

It will be observed from the foregoing that the invention provides a particularly simple yet efficient coupling device for connecting the ends of chains, bracelets, bands and other linkages to insure against accidental uncoupling of the parts. Even should the cover 20 of the clasp or coupling not be securely fastened to the base member 10 in applying the bracelet to the wrist, any strain on the bracelet, as by catching it in an object, will still be insufficient to disconnect its ends. Even though the cover 20 should be swung back into open position as shown in Fig. 5, the safety latch or guard 30 will still effectually hold the crossbar 8 of the end-member 7 against release from the coupling until the guard itself is released. Moreover, in uncoupling the bracelet it is more convenient and safer to have the detachable end held after the cover 20 has been opened, as otherwise it is liable to be released prematurely, or before the wearer has had time to grasp the watch or bracelet to prevent it from dropping on the floor.

The present invention thus provides a doubly locked coupling with a guard or safety latch which prevents accidental release of the ends of the bracelet should the clasp not be securely closed; and further insures against premature disconnection of the ends of the bracelet when the wearer opens the coupling.

While the improved coupling device is herein shown and described as embodied in a preferred form of construction with one modified form illustrated, it is to be understood that further modifications may be made in the structure and arrangement of its parts without departing from the spirit or scope of the invention. Therefore, without limiting myself in this respect, I claim:

1. In a clasp or coupling for bracelets, chains and the like, the combination of a pair of hinged elements adapted to be looped through the ends of the chain or bracelet and swung into closed relationship, means for retaining said elements closed together to couple the ends of the bracelet or chain thereto, and a guard hinged to said elements to close therebetween, said guard being adapted to engage one of the hinged elements to open therewith and so constructed and arranged as to prevent the release of the bracelet or chain until it is disengaged from said element.

2. In a clasp or coupling for bracelets, chains and the like, the combination of a hooked element for engagement with the end member of the bracelet or chain, a second hooked element pivoted to the first element and adapted to close into interlocking engagement therewith, and a third element pivotally connected to the other elements and adapted to be swung into locking engagement with one of them, said third element being so constructed and arranged as to retain its locking engagement with the second element when the latter is released from the first element whereby to prevent premature disconnection of the bracelet or chain.

3. In a clasp or coupling for bracelets, chains and the like, the combination of a member adapted to be fixedly attached to one end of the bracelet or chain, a second member pivoted to the first member and adapted to be closed into interlocking engagement therewith, a third member pivoted on the same axis as the other members to adapt it to close into position therebetween, and interlocking means between the second member and third member for maintaining them in interengagement when the second member is swung open from the first member, said third member being so constructed and arranged as to prevent the release of the chain or bracelet until it is of itself released from the second member.

4. A clasp or coupling for bracelets, chains and the like comprising a lower member adapted for permanent attachment to one end of the bracelet or chain, an upper member hinged to the lower member and adapted to be hooked through the opposite end of the chain or bracelet, said upper member having means for releasably engaging the lower member to hold the parts in closed relationship, and a guard pivoted between said lower and upper members and having means for releasably engaging the upper member to hold it in closed relationship therewith when the upper member is opened away from the lower member, said guard so constructed and arranged as to engage the opposite end of the bracelet or chain when the latter is held in the coupling to prevent release thereof until the guard is disengaged from the upper member.

5. A clasp or coupling for bracelets, chains and the like comprising a lower member adapted to be permanently attached to one end of the bracelet or chain, an upper member hinged to said lower member and provided with a hooked end adapted to snap into engagement with the end of the lower member, a guard pivoted to the upper and lower members to adapt it to fold into position therebetween, and means for releasably retaining the guard in closed relationship with the upper member, said guard formed with a portion for engaging the end of the bracelet or chain connected to the coupling to prevent release of the latter until the guard is disengaged from the upper member.

6. In combination, a pair of coupling members hinged together to fold into closed relationship, means for releasably retaining said members in closed relationship, one of said members being formed with a cam-shaped slot, a guard pivoted to fold between said members and provided with means engaging the cam-slot in one of the members to releasably hold it in connection therewith, said guard being so constructed and arranged as to hold the end of the bracelet or chain to prevent its release when the members are swung into open relationship.

7. In combination, a lower member having means for engaging one end of a bracelet or chain, an upper member hinged to said lower member and having a hooked portion adapted to engage around the end of the lower member, said hooked portion having a slot in its end terminating in a widened notch, and a guard pivoted between said upper and lower members and formed with an offset arm extending at substantially right-angles to its main portion with an extension substantially parallel with its main portion, said extension being adapted to enter the slot in the hook on the upper member to seat in the notch thereof to hold the guard in connected relationship with the upper member.

8. A clasp or coupling device comprising a lower member having means for attaching it to the end of a bracelet or chain, an upper member hinged to said lower member and formed with a hooked end adapted to snap over the outer end of the lower member to secure the parts in clasped relationship, said upper member having a recess in its under side and a slot extending through its hooked end and terminating in a notch, and a guard pivoted between the upper and lower members and having a portion adapted to close down against the bottom of the lower member with an arm extending substantially parallel to the main portion of the guard, said extension adapted to slide through the slot in the hooked end of the upper member to seat in its terminal notch to locate it in the recess on the under side of the upper member.

9. A clasp or coupling device comprising a lower member adapted for connection to the end of a bracelet or chain, an upper member hingedly connected to the lower member, means for releasably engaging the upper member with the lower member when said members are folded into closed relationship, a guard pivoted between the members and formed with an arm adapted to seat against the bottom of the lower member and an offset portion extending upwardly therefrom and then outwardly in parallel relation to the upper member when the latter is in closed relationship with the lower member, and means for releasably engaging the end of the guard with the end of the upper member to adapt the guard to swing open with the upper member when the latter is swung away from the lower member.

10. A clasp or coupling device comprising a lower member having hinge-ears at one end and a hook at the opposite end for engagement with the end of a bracelet or chain, an upper member having hinge-ears pivotally connected to the hinge-ears of the lower member and formed with a hook at its opposite end adapted to snap around the hook on the lower member, and a guard pivoted between the ears of the hinged members with its main portion adapted to seat against the bottom of the lower member, said guard formed with an offset arm extending at substantially right-angles to its main portion and a portion extending forwardly therefrom, said upper member having a slot in its hooked end through which the forward end of the guard extends to provide a finger-catch by which the upper member and the guard may be lifted and swung away from the lower member.

JOHN DALO.